United States Patent
Thyagarajan et al.

(10) Patent No.: US 9,527,413 B1
(45) Date of Patent: Dec. 27, 2016

(54) RECLINING SEAT TO MITIGATE THE EFFECTS OF MINE BLAST LOAD ON SPINE AND LOWER LEG INJURIES

(71) Applicants: Ravi S. Thyagarajan, Novi, MI (US); Jaisankar Ramalingam, Farmington Hills, MI (US); Robert G. Kargus, Woodbine, MD (US)

(72) Inventors: Ravi S. Thyagarajan, Novi, MI (US); Jaisankar Ramalingam, Farmington Hills, MI (US); Robert G. Kargus, Woodbine, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 236 days.

(21) Appl. No.: 14/078,059

(22) Filed: Nov. 12, 2013

(51) Int. Cl.
*B60N 2/42* (2006.01)

(52) U.S. Cl.
CPC .................... *B60N 2/4242* (2013.01)

(58) Field of Classification Search
CPC .... B60N 2/42736; B60N 2/4242; B60N 2/509
USPC ..................................................... 297/216.19
See application file for complete search history.

(56) References Cited

U.S. PATENT DOCUMENTS

| | | | | |
|---|---|---|---|---|
| 2,227,717 A * | 1/1941 | Jones | ............... | B64D 25/04 296/68.1 |
| 2,916,081 A * | 12/1959 | Pinkel | ............... | B60N 2/4214 244/122 R |
| 3,357,736 A * | 12/1967 | McCarthy | ............... | B60N 2/071 296/68.1 |
| 3,998,291 A * | 12/1976 | Davis | ............... | B60N 2/4221 180/271 |
| 4,720,139 A * | 1/1988 | McSmith | ............... | B60N 2/4214 188/373 |
| 5,176,356 A * | 1/1993 | Lorbiecki | ............... | B60N 2/504 248/157 |
| 5,366,269 A * | 11/1994 | Beauvais | ............... | B60N 2/4214 297/216.19 |
| 6,322,140 B1 * | 11/2001 | Jessup | ............... | B60N 2/4221 296/68.1 |
| 7,484,799 B2 * | 2/2009 | Meyer | ............... | B60N 2/0715 248/622 |
| 8,197,004 B2 * | 6/2012 | Wahls | ............... | B60N 2/502 297/344.1 |

* cited by examiner

*Primary Examiner* — Sarah McPartlin
(74) *Attorney, Agent, or Firm* — Gary A. Smith; Christina Degnore; David L. Kuhn

(57) ABSTRACT

A seat assembly reclines during an under-vehicle explosion or other upward impact on the vehicle to mitigate spinal and lower leg damage to a human occupant. The seat assembly has a back frame portion and a lower frame portion. The lower frame portion has a pivotal connection with an energy absorbing mechanism mounted to the vehicle floor. The pivotal connection includes a stop mechanism to prevent seat assembly tilt during normal vehicle operation but allow tilt due to an explosion. A second mechanism is disposed between the back frame portion and the floor; this mechanism controls the seat assembly pivot and provides further absorbing of energy from the upward impact. Projections from the front of the lower frame portion toward the floor can be used to enhance seat assembly pivoting; specially designed seat engagement levers can be used for this purpose as well.

17 Claims, 5 Drawing Sheets

(SECT. A-A)

US 9,527,413 B1

RECLINING SEAT TO MITIGATE THE EFFECTS OF MINE BLAST LOAD ON SPINE AND LOWER LEG INJURIES

GOVERNMENT INTEREST

The invention described herein may be made, used and licensed by and for the U.S. Government for governmental purposes without paying royalty to us.

BACKGROUND OF THE INVENTION

1. Field of the Invention

The invention herein relates to the structure of seats in vehicles wherein the seats are designed to protect their occupants from violent impacts to the vehicle by means of energy absorbing devices incorporated into the seat structure. The invention more particularly relates to seats that pivot or otherwise move in reaction to the violent impacts so as to enhance occupant protection.

2. Background Art

In U.S. Pat. No. 8,087,729 B2 to Kladde, FIG. 7 in light of FIGS. 57 and 58 shows a seat that pivots on a number of axes; Kladde also shows a shock absorber connected between the back rest of the seat and the floor of the compartment where the seat is installed. European Patent EP 0834271 B1 to Bieselt at FIG. 1 shows a chair whose seat pan and back rest tilt backward wherein a coil spring resists tilting and biases the chair toward an upright position. U.S. Pat. No. 4,790,595 to Hensel et al. shows a pivoting seat where the pivot axis is located at the front edge of the seat pan. European Patent EP 0799741 to Gimbel shows a seat pivoted at the front edge of the seat pan, there being a coil torsion spring to resist tilting motion. U.S. Pat. No. 7,878,312 to Chen et al. shows an energy absorbing mechanism underneath a seat. U.S. Pat. No. 5,082,311 to Melotik shows a pin and slot feature at FIG. 4 wherein a pin forced along a slot narrower than the pin's diameter so as to deform a narrow strip of metal in a collapsible steering column assembly wherein impact energy is absorbed by the strip. A modified pin-and-slot feature preferably having a detent is incorporated into our seat assembly to control the assembly's pivoting.

SUMMARY OF THE INVENTION

The invention is a seat assembly and associated structure in a vehicle which reduces or eliminates damage to the spinal columns and lower legs of vehicle occupants when land mines or like munitions detonate beneath the vehicle, or when other upward impacts on the vehicle occur. The seat assembly reclines under the influence of an upward impact so that the occupant's spinal column is also reclined and thus is better able to tolerate the impact. The seat assembly is constructed so that the occupant's feet are lifted from the floor in the event of an under-vehicle explosion, whereby the sudden rise of the floor relative to the rest of the vehicle does not jolt the feet and cause injury to the lower limbs of the occupant. The seat assembly includes a seat assembly frame having a lower frame portion fixed to a back frame portion. A shock absorber, or other mechanism for absorbing energy, supports the seat assembly on the vehicle floor. A pivotal connection between the lower frame portion and the shock absorber is disposed near the front edge of the lower frame portion. A stop mechanism is incorporated in the pivotal connection for preventing tilting of the seat assembly when less than a predetermined amount of tilting force acts on the seat assembly, whereby the seat assembly tilts when an under-vehicle explosion occurs, but does not tilt during normal vehicle operation. In a second embodiment of our seat assembly, a projection extends down toward the floor from the front edge of the lower frame portion of the seat assembly frame. The projection engages a zone of the floor that rises faster than the rest of the floor during an under vehicle explosion and accelerates the tilting of the seat assembly. The accelerated tilting by the protrusion is enhanced as the seat assembly compresses the energy absorbing mechanism and lowers toward the vehicle floor. In a third embodiment of the seat assembly, the protrusion is replaced by a dog-leg lever pivoted on the floor beneath the assembly. The lever has one leg that engages the faster rising zone of the floor and another leg that pulls on a strut extending from the back frame portion of the seat assembly. Due to the lever's operation the faster rising zone imparts a pivoting force to the seat assembly.

DETAILED DESCRIPTION OF THE PREFERRED EMBODIMENTS

Figure 1:
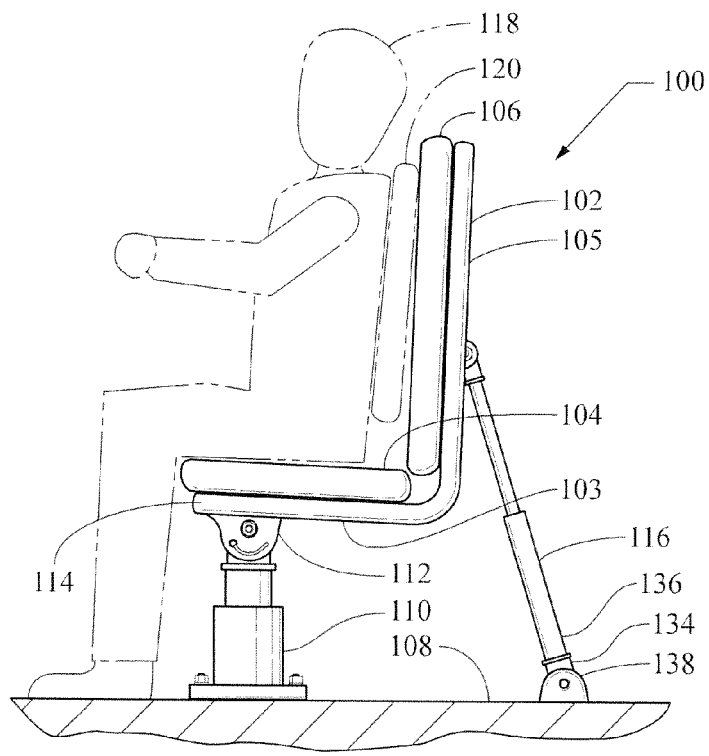
FIG. 1 is a side view of a first embodiment of our reclining seat and associated structure.

Definitions and Terminology:

The following definitions and terminology are applied as understood by one skilled in the appropriate art.

The singular forms such as "a," "an," and "the" include plural references unless the context clearly indicates otherwise. For example, reference to "a material" includes reference to one or more of such materials, and "an element" includes reference to one or more of such elements.

As used herein, "substantial" and "about", when used in reference to a quantity or amount of a material, dimension, characteristic, parameter, and the like, refer to an amount that is sufficient to provide an effect that the material or characteristic was intended to provide as understood by one skilled in the art. The amount of variation generally depends on the specific implementation. Similarly, "substantially free of" or the like refers to the lack of an identified composition, characteristic, or property. Particularly, assemblies that are identified as being "substantially free of" are either completely absent of the characteristic, or the characteristic is present only in values which are small enough that no meaningful effect on the desired results is generated.

Concentrations, values, dimensions, amounts, and other quantitative data may be presented herein in a range format. One skilled in the art will understand that such range format is used for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a size range of about 1 dimensional unit to about 100 dimensional units should be interpreted to include not only the explicitly recited limits, but also to include individual sizes such as 2 dimensional units, 3 dimensional units, 10 dimensional units, and the like; and sub-ranges such as 10 dimensional units to 50 dimensional units, 20 dimensional units to 100 dimensional units, and the like.

For a vehicle, and a system mounted on or used in connection with the vehicle, forward/reverse (longitudinal) and vertical (up/down) directions are generally relative to the vehicle and system as typically operated (e.g., when the vehicle is operated with the respective powertrain in a forward/reverse mode). As such, lateral (left/right) directions are generally perpendicular to the longitudinal/vertical plane, and are referenced from a vehicle operator (e.g., driver) perspective. A first direction (e.g., forward) and a second direction (e.g., rearward or reverse) where the second direction substantially, but not necessarily wholly, opposes the first direction are also generally or used in connection with the vehicle. Likewise, elements located (mounted, positioned, placed, installed, etc.) on, near, or proximate to the vehicle body are generally referred to as "inner", while elements that are distal or more remote to the vehicle body are generally referred to as "outer", unless otherwise noted. As such, inner elements are generally closer to the vehicle body than outer elements. Unless otherwise stated, a vehicle is presumed to be standing on a horizontal surface and vehicle components, such as a body panel or window that are vertically oriented, are disposed normal to the horizontal surface. Likewise, "the vertical" or a "vertical plane" refers to a plane normal to the horizontal surface upon which the vehicle rests.

In FIG. 1 is shown a seat assembly 100 having a generally L-shaped frame 102 having a lower portion 103 and a back portion 105; these portions are preferably rigid and fixed relative to one another so that the occupant's feet and legs are lifted when seat assembly 100 reclines. Attached to lower portion 103 is a bottom cushion 104 and attached to back portion 105 is a back cushion 106. The seat assembly is mounted to and supported on vehicle floor 108 by a collapsible energy absorbing mechanism such as a spring loaded cylinder or other type of shock absorber 110; this shock absorbing mechanism is the primary means by which energy of vertical force components from under-vehicle explosions is absorbed. The seat assembly has a seat pivotal connection 112 to shock absorber 110 at or near the front edge 114 of frame 102, details of this connection being shown in FIGS. 3 through 7. A shock absorbing strut 116 is connected between the rear of frame 102 and floor 108, strut 116 typically a being a spring loaded cylinder. Strut 116 provides a controlled resistance and slowing of the pivoting of seat assembly 100. Strut 116 also is a secondary means to absorb energy of vertical force components from under-vehicle explosions and preferably is less resistant to compression than is shock absorber 110. Neither shock absorber 110 nor strut 116 needs to be a spring-and-damper arrangement but can alternately be brackets that yield plastically or wires or rods that bend to take up mechanical energy; in some cases plastically deformable elements may preferred to spring-and-damper arrangements. The human occupant 118 of the seat assembly is shown in dashed lines as is a backpack 120 worn by the occupant. Backpack 120 is typically a camel-back water carrier but can be another type of container or personal equipment of the occupant. The occupant is in a forward or upright seating position as is normal for occupants of military vehicles, as opposed to a slightly reclining position normal for civilian passenger vehicles. Preferably in the FIG. 1 embodiment, the combined center of gravity of the occupant and the backpack is rearward of pivotal connection 112; by this arrangement, when floor 108 is accelerated by an under-vehicle explosive blast or other upward impact, the inertia of the occupant's mass will cause seat assembly 100 to swing clockwise about the axis of pivotal connection 112 as viewed in FIG. 1.

Figures 2, 3:
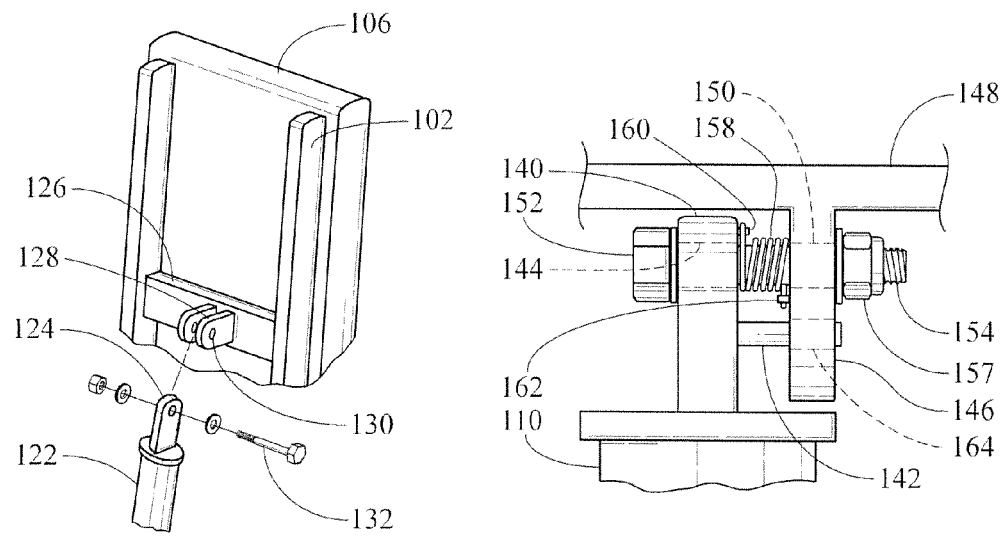
FIG. 2 is a detail view of a pivotal connection between the seat assembly frame and a shock absorbing strut.
FIG. 3 is a detail view of the pivotal connection between the bottom of the seat assembly and a shock absorber directly beneath the seat assembly.
Figure 4:
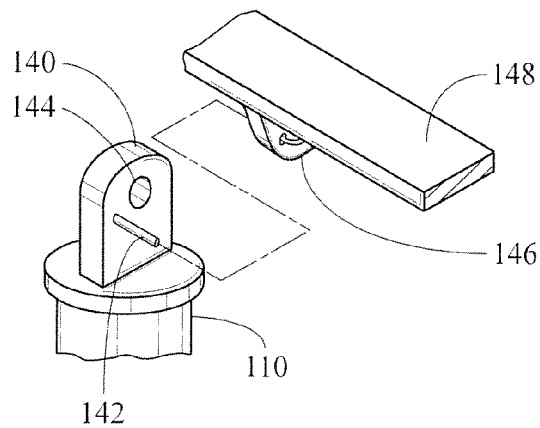
FIG. 4 is a further detail view of the pivotal connection shown in FIG. 3.

FIG. 2 shows details of the connection between strut 116 and frame 102, wherein upper end 122 of the strut includes apertured flange 124. Frame 102 includes a cross member 126 from which protrude a pair of ears 128 having through holes 130. A partly threaded pin 132 passes through ears 128 and flange 124 such that relative pivotal motion between the flange and ears is allowed, so that frame 102 and strut 116 can have a rotational motion component with respect to one another. The pivotal connection between strut 116 and floor 108 can be similar wherein flange 134 on lower end 136 of the strut engages with ears 138 protruding from the floor. It is preferred that strut 116 as shown in FIG. 1 is in its fully extended position so as to prevent forward tilting of assembly 100 while providing controlled resistance to rearward or clockwise tilting as viewed in that figure. Strut 116 acts as a stabilizer for seat assembly 100 in that the strut prevents all motion of the assembly except for controlled rearward tilting or vertical motion.

Figure 5:
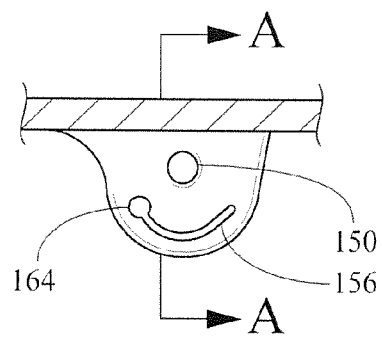
FIG. 5 and FIG. 6 are still further detail views of the pivotal connection shown in FIG. 3.
Figure 6:
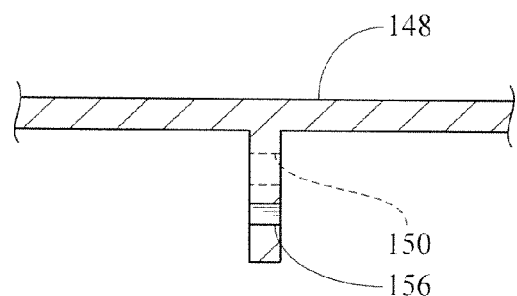

The pivotal connection between shock absorber 110 and frame 102 is shown in FIG. 3 wherein a rounded plate-like dog 140 is affixed to the top of shock absorber 110. A lock finger 142 protrudes from one side of dog 140 and a bore 144 is defined through the dog. A complementary plate-like dog 146 is affixed to a frame cross member 148, cross member 148 typically being attached to frame 102 in the same fashion as cross member 126 in FIG. 2. As best seen in FIG. 5, dog 146 has a through bore 150 that axially aligns with bore 144 of dog 140. A partly threaded pin 152 passes through bores 144 and 150, the threaded portion 154 located at one end of the pin's shaft, where nut 157 fastens to the pin. The potions of the pin's shaft within the bores are smooth and journal with the bores. Encircling the portion of pin 152 between dogs 140 and 146 is a torsion spring 158 which resists pivoting of seat assembly 100 in a backward direction or a clockwise direction in FIG. 1. Spring 158 engages posts 160 and 162 on dogs 140 and 146 respectively.

Figure 7:
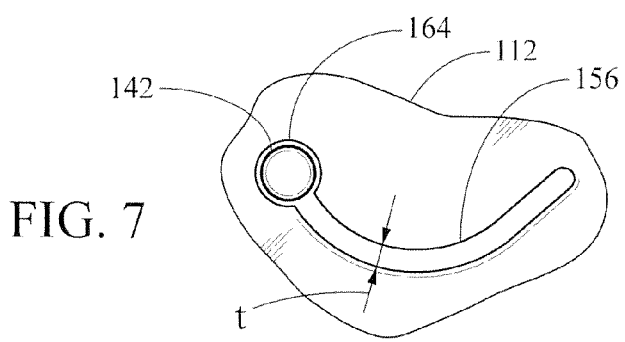
FIG. 7 is a detail view showing a pin-and-slot arrangement of the stop mechanism in the pivotal connection shown in FIG. 3.

Finger 142 passes through an opening comprised of aperture 164 and slot 156, the aperture being at one end of arcuate slot 156. Aperture 164 is preferably circular in shape to accommodate finger 142 and has a diameter or width greater than cross width t of slot 156. An enlarged view of slot 156 is shown in FIG. 7 with an annular space between finger 142 and aperture 164; the fit between finger 142 and the aperture is actually preferred to be close. The annular gap is shown for illustrative purposes to enable a viewer to more easily distinguish finger 142 from aperture 164. The diameter or width of finger 142 is greater than the cross width t of slot 156 so that finger 142 remains in aperture 164 unless a predetermined sufficient tilting force is exerted seat assembly 100. If such a sufficient tilting force acts on assembly 100, then finger 142 is forced it to travel along slot 156. As finger 142 travels along the slot, the slot is deformed and provides resistance to the travel. The combination of finger 142, aperture 164 and slot 156 comprise a stop mechanism that prevents seat assembly 100 from tilting about pivotal connection 112 during normal operation of a vehicle where assembly 100 is installed; thus, as the vehicle traverses over terrain, seat assembly 100 will not swing back and forth. However, should a land mine explode under the vehicle, the upward blast force component will create a pivotal force on seat assembly 100 such that finger 142 will be forced to travel along slot 156. It will be noted that the thickness t of the slot need not be constant but can be varied along the slot's length to provide a programmed resistance to the tilting of seat assembly 100.

Figure 14:
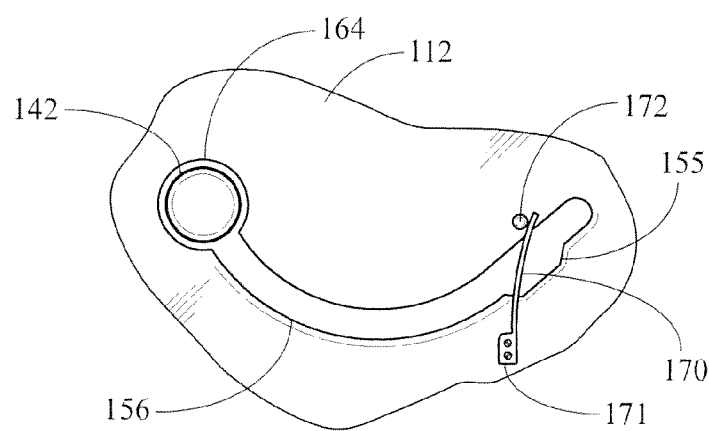
FIG. 14 is an alternate embodiment of the pin-and slot arrangement shown in FIG. 7.

FIG. 14 shows a variation of the pin-and-slot arrangement of FIG. 7 wherein a detent 170 is mounted on pivot connection 112, the detent being a flexible member and preferably being a finger-like cantilever spring. The detent is attached to pivotal connection 112 at base 171 by screws or a welding or other conventional fastening means. Affixed to pivotal connection 112 is a post 172, the detent being biased against post 172 at a side of the post faced away from aperture 164. The detent extends across arcuate slot 156 and is elastically deformed by lock finger 142 as the lock finger moves from its FIG. 14 position to the opposite end of the arcuate slot. Slot 156 optionally has a widened portion 155 where the detent crosses the slot so that finger 142 can more easily pass post 172 and detent 170. After lock finger 142 has completely passed by the detent, the detent reassumes its position shown at 170 and the detent then prevents lock finger from travelling back toward aperture 164. Consequently, seat assembly 100 is retained in a reclined position. The detent's use may be preferred when either shock absorber 110 or strut 116 exhibits at least party elastic deformation—as opposed to completely inelastic deformation—when the seat assembly tilts due to an under-vehicle explosion. The detent is a post-impact retention means in that the detent keeps the seat assembly tilted until the vehicle hits the ground after being lifted by the explosion. The detent counters any tendency of shock absorber 110 or strut 116 to return the seat assembly to its upright or pre-explosion position.

Typically, portions of a vehicle floor rise relative to the rest of the vehicle as a result of under-vehicle explosions and the floor rise contributes to lower limb injuries of personnel in the vehicle. To address this problem, it may be preferred that the pivoting of seat assembly 100 be completed relatively quickly, before shock absorber 110 is fully compressed or before the shock absorber is compressed by a chosen percentage of its total compression distance. The resistance to the seat assembly's pivot provided by pivotal connection 112 and strut 116 can be controlled accordingly by the design of these elements. The advantage of the relatively quick pivoting of seat assembly 100 is that the occupant's legs and feet will be swung upward before vehicle floor imparts force from an under-vehicle blast to the occupant's feet, so that the occupant's feet and legs are less likely to be injured.

Figure 8:
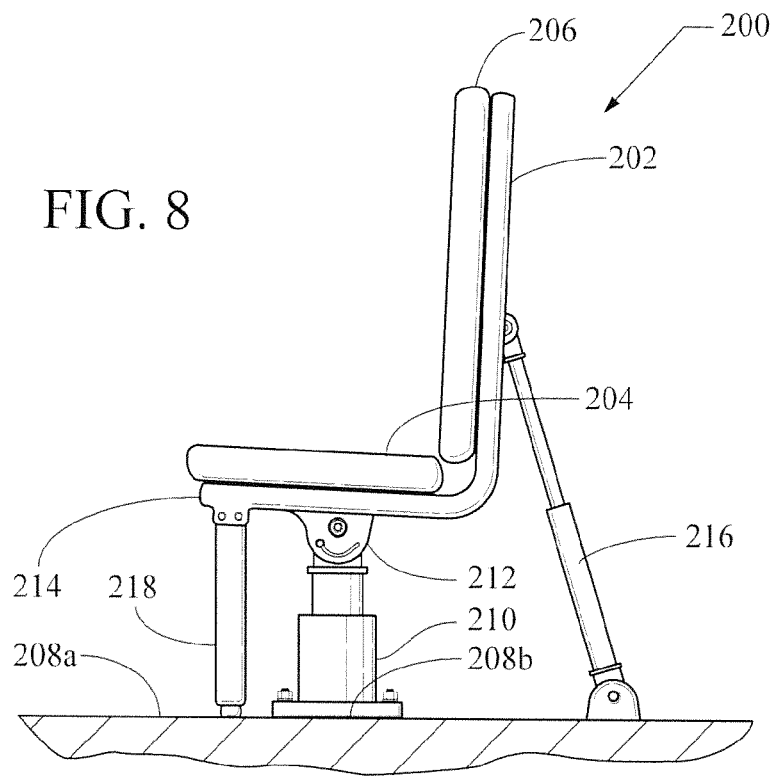
FIG. 8 is a side view of a second embodiment of our reclining seat incorporating a tilt-enhancing seat protrusion.
Figure 9:
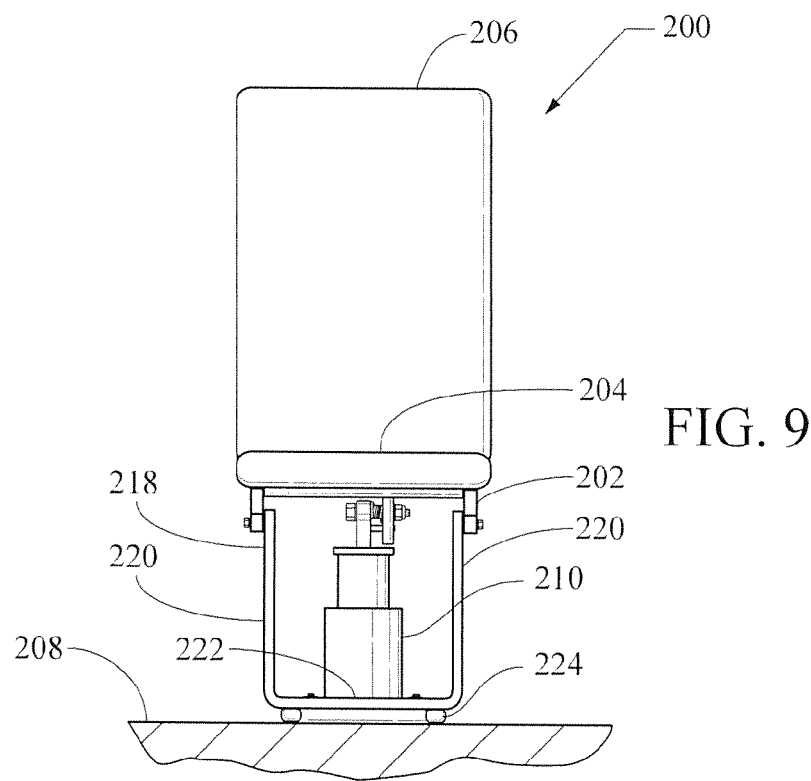
FIG. 9 is a front view of the second embodiment of our reclining seat.
Figure 10:
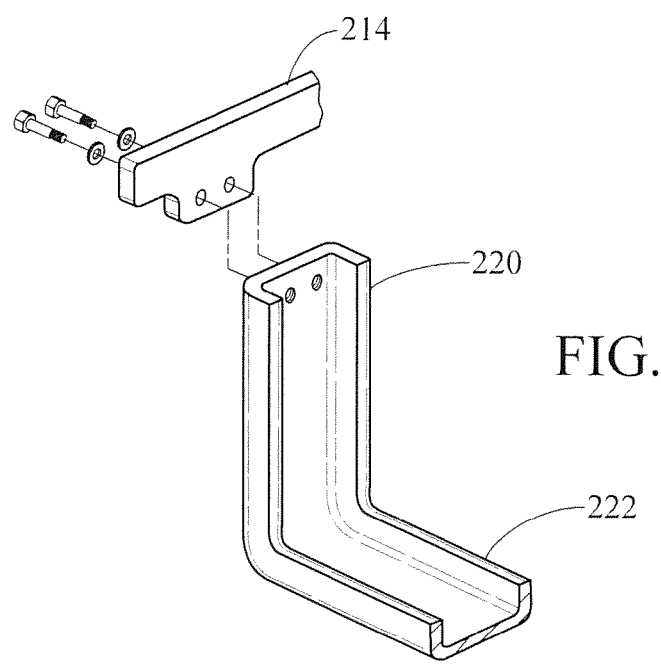
FIG. 10 is a detail view of the protrusion's connection to the seat's frame.

In FIGS. 8 and 9 is shown a second embodiment of our invention, which is the same as the first embodiment but has two modifications thereto. In FIGS. 8 and 9 seat assembly 200 has a generally L-shaped frame 202 to which is attached a bottom cushion 204 and a back cushion 206. The seat assembly is mounted to vehicle floor 208 on an energy absorbing mechanism such as shock absorber 210. The seat assembly has a pivotal connection 212 to shock absorber 210 wherein the pivotal connection and shock absorber are disposed underneath a central region of bottom cushion 204. A shock absorbing strut 216 is connected between the rear of frame 202 and floor 208, strut 216 and its connections being similar to what is shown in the first embodiment.

The first modification is that pivotal connection 212 is more remote from front edge 214 of frame 202 than pivotal connection 112 is from front edge 114 of frame 102 in the first embodiment. It is recognized that having pivotal connection 212 more rearward or remote from the front edge of the L-shaped frame may slow pivoting of the seat assembly as influenced by the occupant's center of gravity. However such a location of pivotal connection 212 still allows the occupant's center of gravity to cause pivoting of assembly 200, and such a location of pivotal connection 212 may be advantageous in light of overall design considerations when constructing the cabin area of a military vehicle.

The second modification is used to enhance the pivoting of seat assembly 200, the second modification being a protrusion extending downward from the front of frame 202. The protrusion can be one or more posts extending from edge 214 toward floor or posts extending from floor 208 toward edge 214, or similar structures. In FIGS. 8 and 9, the protrusion takes the form of a U-shaped channel 218 fastened to the front edge 214 of frame 202. Channel 218 has two vertically oriented legs 220 and a lower channel portion 222 connected therebetween, and rubber grommets 224 or other elastomeric bodies are disposed between channel portion 222 and floor 208. Grommets 224 can be eliminated so that there is a gap between lower channel portion 222 and floor 208 or channel member can be disposed on the floor so that the protrusion extends the entire span between edge 214 and floor 208.

As alluded to previously, during an under-vehicle explosion the vehicle floor rises relative to the rest of the vehicle. In many cases the rise of the vehicle floor in front of vehicle occupant seats rises more than does the floor beneath the vehicle seats; such a phenomenon commonly occurs where there are side-facing seat assemblies in rear compartments of some military vehicles. In any case, depending on the exact location of an under-vehicle explosion, the section of the vehicle floor directly in front of a seat assembly can rise faster than the portion of the floor immediately below the seat assembly. Thus in FIG. 8, vehicle floor portion 208a directly in front of seat assembly 200 can rise more quickly than vehicle floor portion 208b immediately below the seat assembly as the result of an under-vehicle explosion. In this situation, floor section 208a will raise channel 218 or other, equivalent protrusion, whereby seat assembly 200 is tilted backward or clockwise in FIG. 8. Also in this situation as shock absorber 210 is compressed, channel 218 holds up the front of the seat assembly 200 while allowing the back of the seat assembly to lower, whereby the tilting motion of assembly 200 is enhanced. It should be noted that the foregoing tilting effects caused by channel 218 are in addition to, and independent of the tilting effect caused by the occupant's center of gravity.

Figure 11:
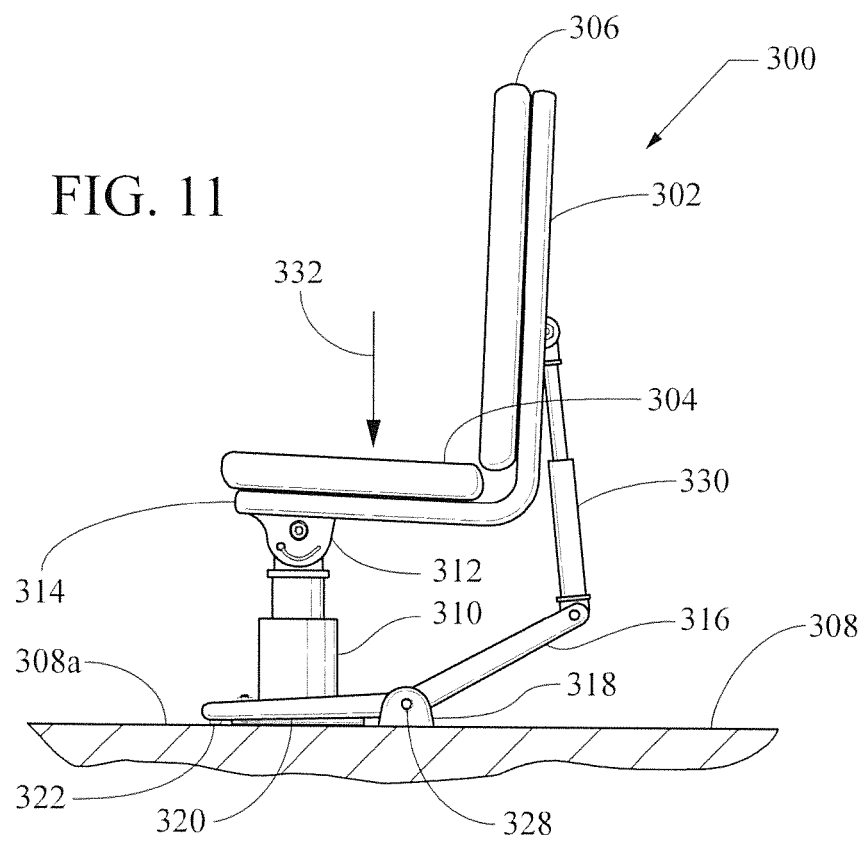
FIG. 11 is a side view of a third embodiment of our reclining seat incorporating a recline-assisting mechanism.
Figure 12:
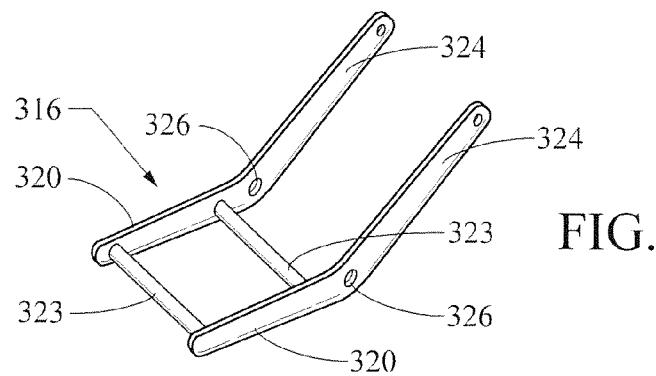
FIG. 12 and FIG. 13 are detail views showing the recline-assisting mechanism.
Figure 13:
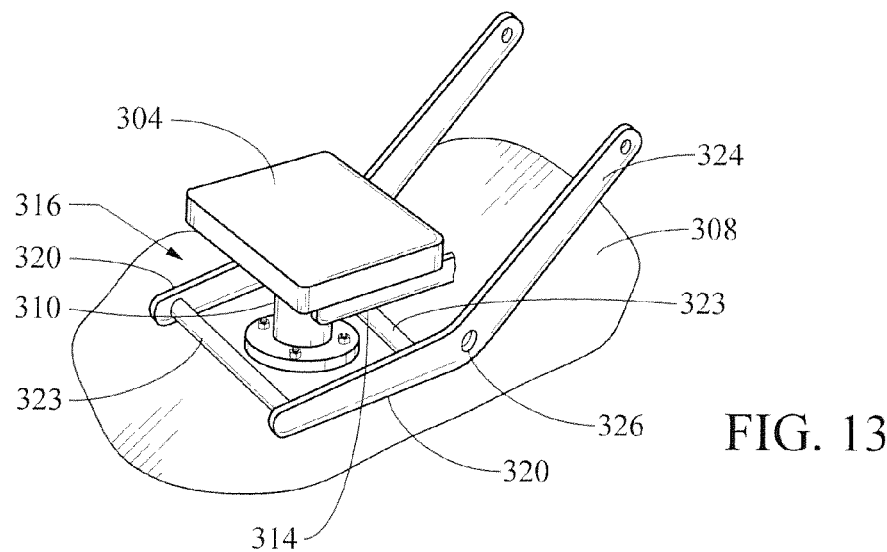

In FIG. 11 is shown a third embodiment of our invention, which again is the same as the first embodiment aside from the two modifications now described. In FIG. 11, seat assembly 300 has a generally L-shaped seat frame 302 to which is attached a bottom cushion 304 and a back cushion 306. The seat assembly is mounted to vehicle floor 308 on shock absorber 310. The seat assembly has a pivotal connection 312, in all respects the same as pivotal connection 112, to shock absorber 310 at or near the front edge 314 of frame 302. The first modification in the FIG. 11 embodiment is the addition of a recline-assist feature not featured in the first embodiment. The recline assist feature comprises a frame 316 disposed under seat assembly 300, the frame having two dog-leg levers wherein each lever has a foreleg 320 and an aft leg 324. Frame 316 is pivotally connected to floor 308 at a pivot connection at block 318, which is located behind shock absorber 310 and under a central region of bottom cushion 304. Forelegs 320 extend from the pivot block to a point forward of shock absorber 310 and forward of 310 front edge 314 of seat frame 302. The free ends of forelegs 320 are disposed over a zone 308a of the floor immediately in front of seat assembly 300 and the forelegs can extend further forward along zone 308a than is shown in FIG. 11 if desired for a particular application. Optionally a rubber grommet 322 or other elastomeric body can be placed between the free ends of forelegs 320 and floor zone 308a or else the free ends can be in contact with zone 308. Preferably, transverse members 323 are affixed between forelegs 320 such that frame 316 is a rigid structure. Aft legs 324 extend from forelegs 320, there being apertures 326 at the region of frame 316 where the forelegs and aft legs meet. Pivot pins 328 (See FIG. 11.) pass through apertures 326 and through blocks 318 so as to create a rocking or pivoting connection of the dog-leg levers with blocks 318.

Seat assembly 300 includes shock absorbing struts 330 generally similar in construction to strut 116; struts 300 are pivotably connected in any suitable conventional fashion between the rear of frame 302 and aft legs 324, struts 330 typically being spring loaded cylinders. As with strut 116, struts 330 need not have a spring-and-damper construction, but can alternately be brackets that yield plastically or wires or rods that bend to take up mechanical energy. The second modification to the FIG. 11 embodiment is that struts 330 are in tension during normal vehicle operation before an under-vehicle explosion occurs. Thus were it not for the stop mechanism in pivotal connection 312, which is similar to the stop mechanism in pivotal connection 112, seat assembly 300 would pivot backward or clockwise as seen in FIG. 11.

When an under-vehicle explosion occurs, seat assembly 300 will swing or pivot backwards due to two independent phenomena. One phenomenon is the effect of the occupant's weight on seat assembly 300. As a result of the explosion, the vehicle will rise suddenly and consequently seat assembly 300 will rise as well, whereby the occupant's weight or inertia will create a downward force vector 332 relative to assembly 300. This force vector will cause assembly 300 to pivot backward such that the occupant is in a reclined position and the occupant's feet are lifted off floor 308. The second phenomenon also occurs as a result of the explosion; namely, floor 308 will buckle upward such that the floor, or at least portions thereof, will rise faster than the rest of the vehicle. In many cases, and perhaps in the majority of cases, zone 308a of the floor will rise faster and further than the rest of the floor and will create an upward force on forelegs 320 of dog-leg frame 316. The upward force pivots frame 316 and causes the frame to pull struts 320 downward so as to pivot seat assembly backward 300 to a reclined position.

Various alterations and modifications will become apparent to those skilled in the art without departing from the scope and spirit of this invention and it is understood this invention is limited only by the following claims.

What is claimed is:

1. A combination of a seat assembly and associated structure in a vehicle for reclining the seat assembly in response to an upward acceleration of the vehicle so as to mitigate injury to a human occupant of the seat assembly, comprising:
a seat assembly frame;
a lower frame portion of the seat assembly frame;
a back frame portion of the seat assembly frame;
a front of the lower frame portion;
a primary means for absorbing energy from the upward acceleration, wherein the primary means is also a means to mount and support the seat assembly on a floor of the vehicle;
a seat pivotal connection between the lower frame portion and the primary means, the seat pivotal connection being disposed at the front of the lower frame portion;
a secondary means for absorbing energy from the upward acceleration, the secondary means connected between the back frame portion and the floor, wherein the secondary means is also a means to provide controlled resistance to pivoting of the seat assembly, the secondary means comprising a strut pivotally mounted to the floor at one strut end and pivotally connected to the back frame portion at another strut end; and
stop means incorporated in the seat pivotal connection for preventing tilting of the seat assembly when less than a predetermined amount of tilting force acts on the seat assembly, the stop means including retention means for keeping the seat assembly in a tilted position.

2. The combination of claim 1, wherein:
the seat pivotal connection comprises a first dog attached to the lower frame member, a second dog on the primary means and a pin journalled with the first dog and the second dog; and
the stop means comprises an opening defined in one of the dogs, the opening having an arcuate slot and an aperture at one end of the arcuate slot, the aperture having an aperture width greater than a cross width of the slot, the stop means further comprising a finger protruding from another of the dogs and through the opening, the finger sized to fit through the aperture and having a finger width greater than the cross width of the slot.

3. The combination of claim 1 wherein the primary means is a compressible element and wherein the combination includes means to permit complete pivoting of the seat assembly in reaction to the acceleration before the primary means compresses by a predetermined amount.

4. The combination of claim 1 wherein the frame portions are rigid and fixed relative to one another.

5. The combination of claim 3 wherein the primary means and the secondary means are plastically deformable elements and wherein the primary means is more resistant to compression that the secondary means.

6. A seat assembly for a military vehicle and operative to tilt to a reclined position in response to an upward acceleration of the vehicle, comprising:
a seat frame for supporting an occupant, the frame comprising a seat bottom having a front edge and a rear edge, and further comprising a seat back connected with the seat bottom adjacent the rear edge and extending upward therefrom;
a first energy absorbing mechanism operatively positioned between a floor of the vehicle and the seat frame to absorb energy transferred to the seat frame by an upward acceleration of the vehicle, an upper end of the first energy absorbing mechanism connected to the seat frame by a pivotal connection forward of a center of gravity of the occupant;

a second energy absorbing mechanism positioned between the floor and the seat frame to absorb energy transferred to the seat frame by the upward acceleration of the vehicle, an upper end of the second energy absorbing mechanism connected to the seat frame rearward of the center of gravity, the second energy absorbing mechanism adapted to absorb energy when subjected to a compression load and thereby provide controlled resistance to rearward tilting of the seat assembly about the pivotal connection; and a stop mechanism incorporated in the pivotal connection, the stop mechanism preventing rearward tilting of the seat assembly about the pivotal connection when less than a predetermined amount of tilting force acts on the seat assembly.

7. The seat assembly of claim 6 wherein the stop mechanism includes a retainer operative to keep the seat assembly in a rearward-tilted position.

8. The seat assembly of claim 6, wherein:

the pivotal connection comprises a first dog attached to the seat bottom, a second dog on the first energy absorbing mechanism and a pin journalled with the first dog and the second dog; and the stop mechanism comprises an opening defined in one of the dogs, the opening having an arcuate slot and an aperture at one end of the arcuate slot, the aperture having an aperture width greater than a cross width of the slot, and the stop mechanism further comprises a finger protruding from another of the dogs and through the opening, the finger sized to fit through the aperture and having a finger width greater than the cross width of the slot.

9. The seat assembly of claim 6 wherein the first energy absorbing mechanism is a compressible element and wherein the first energy absorbing mechanism, the second energy absorbing mechanism, and the stop mechanism provide respective resistances to tilting of the seat assembly such that complete rearward pivoting of the seat assembly in reaction to the acceleration occurs before the first energy absorbing mechanism compresses by a predetermined amount.

10. The seat assembly of claim 6 wherein the seat bottom and the seat back are rigid and fixed relative to one another.

11. The seat assembly of claim 6 wherein at least one of the first and second energy absorbing mechanism is a plastically deformable element.

12. The seat assembly of claim 11 wherein both of the first and second energy absorbing mechanism are plastically deformable elements, and the first energy absorbing mechanism is more resistant to compression that the second energy absorbing mechanism.

13. An energy absorbing seat assembly for a military vehicle, comprising:

a seat frame for supporting an occupant, the frame comprising a seat bottom having a front edge and a rear edge, and further comprising a seat back connected with the seat bottom adjacent the rear edge and extending upward therefrom;

a compressible energy absorbing mechanism operatively positioned between a floor of the vehicle and the seat frame to absorb energy transferred to the seat frame by an upward acceleration of the vehicle, an upper end of the energy absorbing mechanism connected to the seat frame by a pivotal connection forward of a center of gravity of the occupant; and a stop mechanism operatively integrated with the pivotal connection to prevent rearward tilting of the seat assembly about the pivotal connection when less than a predetermined amount of tilting force acts on the seat assembly, wherein the stop mechanism provides controlled resistance to tilting of the seat assembly through a range of rearward tilting movement after the predetermined amount of tilting force is exceeded.

14. The seat assembly of claim 13, wherein:

the pivotal connection comprises a first dog attached to the seat bottom, a second dog on the shock absorber and a pin journalled with the first dog and the second dog; and the stop mechanism comprises an opening defined in one of the dogs, the opening having an arcuate slot and an aperture at one end of the arcuate slot, the aperture having an aperture width greater than a cross width of the slot, the stop mechanism further comprising a finger protruding from another of the dogs and through the opening, the finger sized to fit through the aperture and having a finger width greater than the cross width of the slot, whereby the controlled resistance to tilting of the seat assembly is provided by deformation of the one of the dogs having the slot as the finger moves along the slot and displaces material on either side of the slot.

15. The seat assembly of claim 13 wherein the compressible energy absorbing mechanism and the stop mechanism provide respective resistances to movement of the seat assembly such that complete rearward pivoting of the seat assembly in reaction to the acceleration occurs before the energy absorbing mechanism compresses by a predetermined amount.

16. The seat assembly of claim 13 wherein the stop mechanism includes a retainer operative to keep the seat assembly in a rearward-tilted position.

17. The seat assembly of claim 13 further comprising a second energy absorbing mechanism positioned between the floor and the seat frame to absorb energy transferred to the seat frame by the acceleration, an upper end of the second energy absorbing mechanism connected to the seat frame rearward of the center of gravity, the second energy absorbing mechanism adapted to absorb energy when subjected to a compression load and thereby provide controlled resistance to rearward tilting of the seat assembly about the pivotal connection.

* * * * *